United States Patent [19]  [11] 3,959,065
Ashcroft  [45] May 25, 1976

[54] METHOD AND APPARATUS FOR PRODUCING PLASTIC-COVERED CONTAINERS

[75] Inventor: Richard I. Ashcroft, Alameda, Calif.

[73] Assignee: Owens-Illinois, Inc., Toledo, Ohio

[22] Filed: Apr. 25, 1974

[21] Appl. No.: 464,224

[52] U.S. Cl. ............................... 156/423; 156/86; 156/294; 156/444; 156/458; 156/499; 156/567
[51] Int. Cl.² .......................................... B29D 3/00
[58] Field of Search ............... 156/85, 86, 423, 443, 156/497, 444, 446, 458, 475, 499, 538, 556, 566, 567, 293, 294; 264/230, 342 R; 425/72, 503, 507, 508

[56] References Cited
UNITED STATES PATENTS

| | | | |
|---|---|---|---|
| 2,452,607 | 11/1948 | Slaughter | 156/86 |
| 3,324,625 | 6/1967 | Dulmage | 156/497 |
| 3,340,678 | 9/1967 | Rhodes | 156/497 |
| 3,710,531 | 1/1973 | Bielawski | 156/86 |
| 3,767,496 | 10/1973 | Amberg et al. | 156/86 |
| 3,802,942 | 4/1974 | Amberg et al. | 156/86 |

Primary Examiner—William A. Powell
Assistant Examiner—Brian J. Leitten
Attorney, Agent, or Firm—J. R. Nelson

[57] ABSTRACT

The disclosure relates to method and apparatus for producing a base article, such as a container, with a shrunken, surface covering of plastic thereon. While conveyed in axial registry with each other, a sleeve form of shrinkable plastic is telescopically assembled onto the article by a cam-operated push-up element and held in place until the article and sleeve enter a heating device for applying heat to a relatively narrow, band-like region of the sleeve about the article causing the plastic of that region to shrink into gripping engagement with the article to hold the sleeve in place until the next step of the process, e.g. the total heat shrinking of the sleeve on the article. The heating device structure is comprised of opposed elongated nozzles through which hot air of 200°–900°F is applied in a narrow horizontal pattern. The article is conveyed between the opposed nozzles, and during travel therethrough the article is rotated.

10 Claims, 5 Drawing Figures

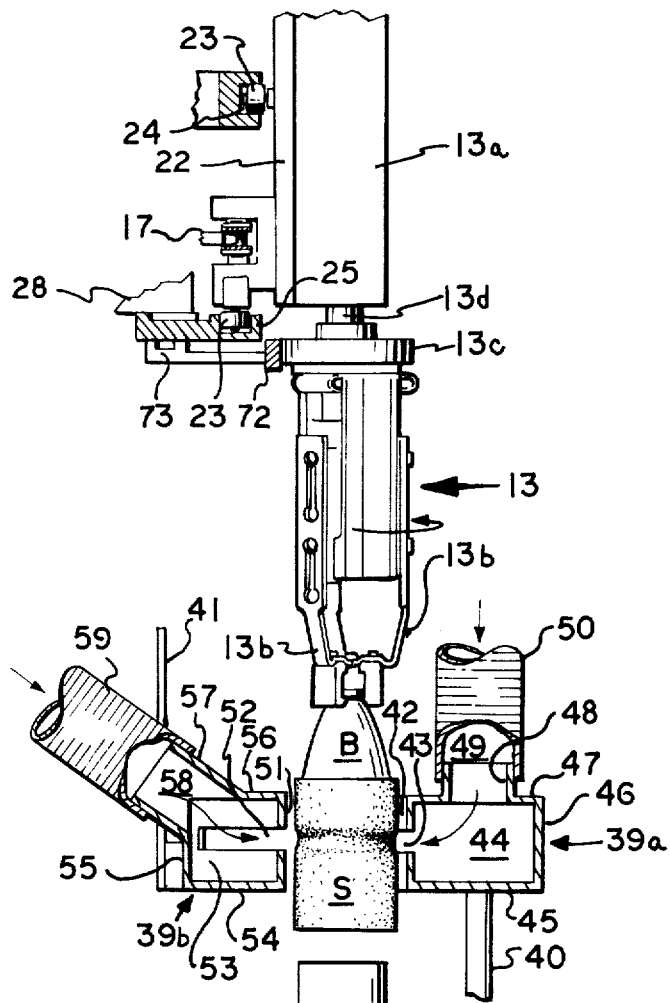
FIG. 2
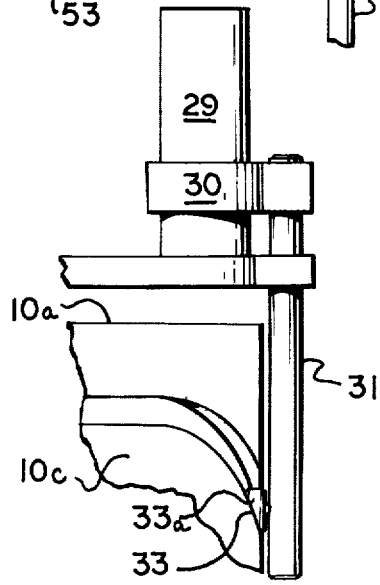

METHOD AND APPARATUS FOR PRODUCING PLASTIC-COVERED CONTAINERS

The invention relates to the manufacture of containers in which a preliminary sleeve form, usually a hollow right cylinder form of a foamed plastic material, is telescopically placed over an article of basic shape and shrunken thereon into article conformity.

The invention comprises an improvement of the method performed in U.S. Pat. No. 3,767,496 and the apparatus disclosed in copending application Ser. No. 209,751 filed Dec. 20, 1971, now U.S. Pat. No. 3,802,942, both of common ownership with the present application.

BACKGROUND OF THE INVENTION

In the process and apparatus for making plastic coated, composite containers, such as is disclosed in U.S. Pat. No. 3,760,968, a manufactured glass bottle is loaded onto a conveyor and transported through a pre-heat apparatus whereat the temperature of the bottle is increased to 175°–300°F. Upon leaving the pre-heat apparatus, the conveyor is guided in a horizontal path around an arcuate end-turn in which plastic sleeves carried on an underlying turret register with the bottles and are moved vertically in a telescopic assembly over the lower ends of the bottles. From that point of assembly, the sleeves are carried on the bottles as the conveyor moves into a heating apparatus, such as a tunnel oven, wherein the temperature, maintained on the order of 175°–800°F, depending on the composition of the plastic of the sleeves, shrinks the sleeves into a snug fitting, comforming relationship over the bottle surface where assembled.

At low production rates, i.e. conveyor speeds, the sleeve will normally shrink enough on the pre-heated bottles to travel from the turret assembly point to the oven without slipping or otherwise dislocating itself on the bottle. Production speeds on the order of 200 bottles per minute or more may cause some dislocation of the sleeve members from initial assembly. It is, therefore, one of the important objects of the present invention to provide a method and means to positively secure the sleeve in the initial telescopic assembly position on the base article to prevent dislocation of the sleeve before overall shrinking even at high production speeds, i.e. in excess of 200 B.P.M.

Another object of the invention is to provide such method and apparatus for assuring against dislocation without increasing pre-heat temperature of the base article over values in current practice; or without the use of external handling mechanism engaging the sleeve to hold it in place between the turret assembly point and the shrink oven.

SUMMARY OF THE INVENTION

The present invention, as is disclosed hereinafter in terms of a specific, preferred embodiment, provides a step in the method of applying a relatively narrow elongated band of heat onto the sleeve exterior at the time the latter is assembled onto the base article being carried by the conveyor, and thereafter for a finite distance in travel toward the shrink oven. The heat is preferably furnished by hot air applied from opposed nozzle banks on either side of the path of the article and closely adjacent thereto. The nozzles are positioned at the proper elevation for zonally shrinking a band region of the sleeve about an adjacent band-like part of the bottle for holding it rather firmly thereon until the sleeve and article travel the sufficient distance into the final heating treatment for complete, overall shrinking of the sleeve on the base article form.

The apparatus provides an arcuate nozzle means conforming to a portion of the conveyor arcuate path, as disclosed herein, and in its broadest sense, the heat tacking means corresponds to the conveyor path in a portion it takes just after the sleeve is telescoped to assembly position by the turret means that handles the sleeve up to that point.

Another feature of the invention is the provision of means for rotating the bottle just as the sleeve is released to it by the turret apparatus for evenly applying the heat for tack-shrinking a band portion of the sleeve about the bottle as the two are conveyed through the opposed tacking nozzles.

A further feature in the apparatus improvement of this invention is the provision of an extended dwell time in the raising motion of the turret machine stripper element or sleeve push-up to assure an overlap in time of the cycle between assembly of the sleeve over the bottle to the fully raised position and the entry of the bottle and sleeve into the zonal tacking heat application. Since the push-up element is cam operated, the improved apparatus of the invention will insure some cam-dwell time after raising the sleeve to full elevation on the bottle before the sleeve push-up element is cammed downwardly (retracted).

Several other attendant objects and advantages of the invention will become apparent to those skilled in the art from the description and drawings of the invention, as will presently appear herein.

BRIEF DESCRIPTION OF THE DRAWINGS

FIG. 2 is a sectional elevational view taken on a line 2—2 on FIG. 1;

DESCRIPTION

Figure 1:
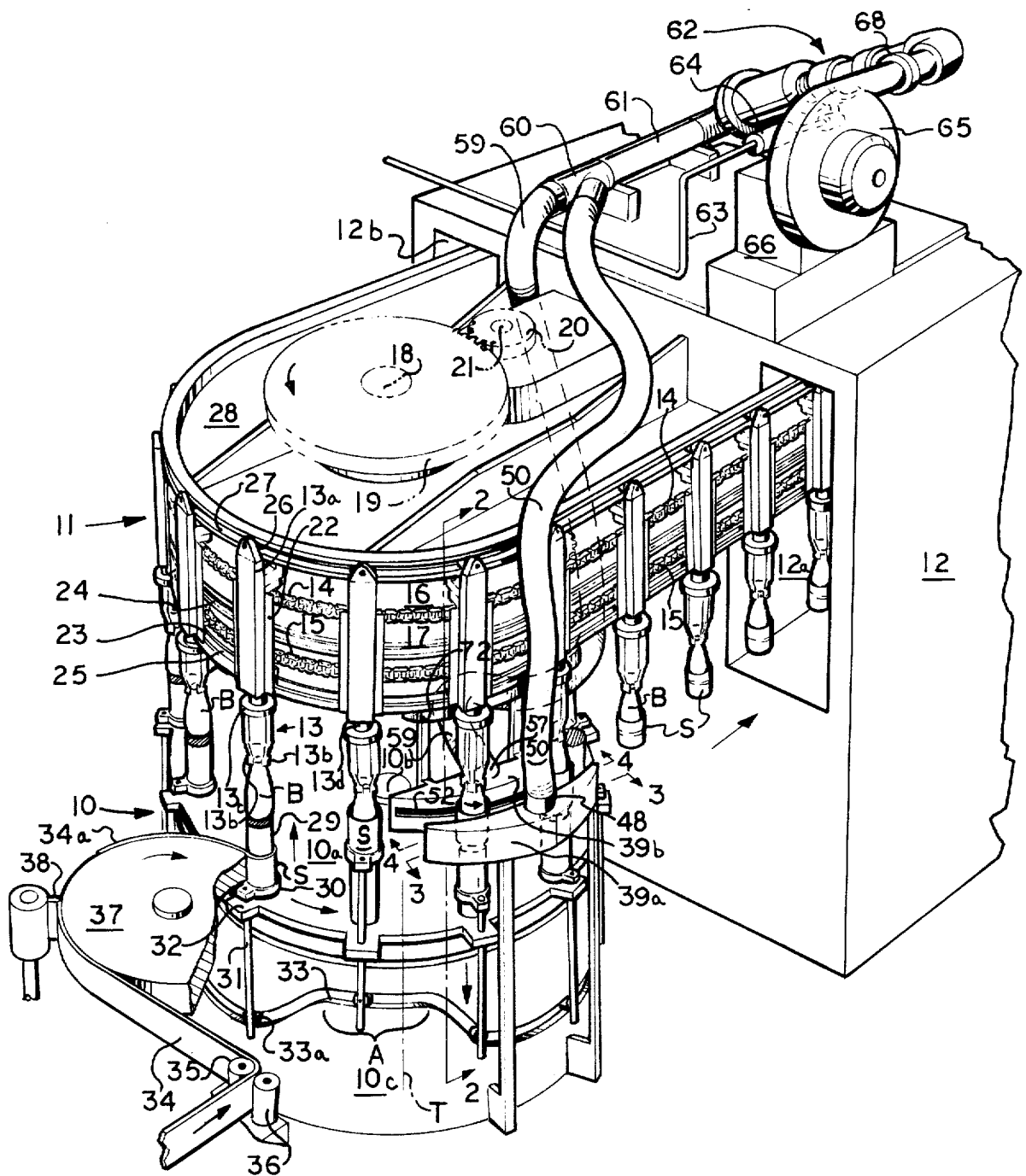
FIG. 1 is the three-quarter front perspective view of a machine for applying plastic sleeves onto glass bottles, and incorporates the improvements of the present invention.

Shown on FIG. 1 is a machine for producing plastic sleeves on a turret machine 10, assembling them telescopically over rigid base articles carried by the conveyor 11 and shrinking them thereon in a heating apparatus 12. The rigid base articles in the examples of the present disclosure are the glass bottles B; and, after having a shrunken plastic covering thereon, form a composite package of the type described and shown in U.S. Pat. No. 3,760,968.

THE MACHINE

The bottles B are fed to and loaded on the neck gripping overhead chucks 13 connected to an endless driven carriage comprised of upper and lower chains 14 and 15, respectively, extending around end-turn gears 16 and 17 each keyed onto the vertical shaft 18. A bull gear 19 is also connected at the upper end of shaft 18 in mesh with drive gear 20 connected to the power drive means (not shown) by the drive shaft 21. Power is transmitted to gear 19 to rotate it and shaft 18 counter-clockwise on FIG. 1 and drive the chains 14, 15 in a counter-clockwise direction through the endless path of the conveyor. Chucks 13 are mounted on carriage brackets 22 connected to links of the chains 14, 15. The several carriage brackets have spaced rollers 23 on their back sides running in stationary tracks 24 and 25 around the path of the conveyor. The chucks 13 are each vertically, slidably mounted on their respective carriage brackets 22 and the vertical elevation of chucks 13 is controlled by the cam roller 26 rotatably connected on the upper element 13a of the chuck running in cam track 27 fastened rigidly on the machine. The chucks 13 have three lower jaws 13b which open and close about the top end of bottle B. The jaws 13b are attached to a circular arbor including a wheel element 13c that is rotatable about shaft 13d of the chuck so that friction engagement of the periphery of the wheel element 13c of the arbor with a stationary element (to be described hereinafter) anywhere along the path of the conveyor imparts rotation of the chucks and bottles thereon about the axis of the shaft 13d.

The end turn portion of the conveyor mechanism is supported by the upper frame 28 rigidly supported on the front wall of the oven 12.

Beneath the conveyor end-turn portion, just described, is the rotary sleeve turret 10 which is coaxial with the vertical shaft 18. Turret machine 10 is comprised of an upper annular turret 10a rotated counter-clockwise about shaft 10b over the lower stationary frame 10c.

The turret machine 10 includes a plurality of spaced mandrels 29 mounted on turret 10a whose peripheral spacing on turret 10a coincides radially and with the peripheral spacing of chucks 13 in the end-turn portion of the conveyor path. The chucks 13 have their centers in registry with the vertical central axes of underlying mandrels 29. At the base of each mandrel in an inactive position there is an annular, encircling push-up bar or stripper element 30 connected onto a vertical operating rod 31 by an arm. Rods 31 are each vertically slidable on the guides 32 connected with turret 10a and under control of the circular cam 33 extending around frame 10c in which a cam roller 33a connected to rod 31 is in running engagement. The cam 33 is a stationary element of turret frame 10c. The pattern of the rise and fall of cam 33 provides the proper vertical reciprocating motion to rod 31 and push-up bar 30 responsive to rotary movement of turret 10a.

Connected for operation with turret machine 10 is mechanism for feeding a supply of plastic strip stock and forming it to sleeve lengths. The strip stock is shown as a running web 34 guided through opposed feed rollers 35, 36 and onto the sleeve drum 37. The web 34 on drum 37 has forward lengths cut therefrom by rotary knife 38, and the cut lengths 34a are held onto drum 37 by vacuum until the leading edge thereof engages a mandrel 29 of turret 10a. The mandrel at this point is engaged by its drive means of the turret machine to rotate it more than 360° winding the strip 34a about a mandrel 29 in an end-to-end overlap of the strip to form a cylindrical shape. Thereafter, means on the turret machine connect the overlapped ends at a vertical seam to complete formation of a cylindrical, hollow sleeve S of the plastic material.

An example of the plastic material is given in the aforementioned U.S. Pat. No. 3,767,496 which, briefly stated, comprises a polystyrene or other thermoplastic that is highly oriented in the longitudinal dimension of the web (circumference of sleeve S) in relation to any orientation of the plastic in the transverse dimension (height of sleeve S). Examples of material that may be run in form of web 34 are foamed polystyrene on the order of 0.010–0.018 inch thickness or foamed polyethylene on the order of 0.008–0.015 inch thickness. Both are highly oriented in the running direction of web 34.

The inner circumference of sleeve S is slightly more than the exterior circumference of the article B so that the sleeve S may be telescopically applied over article B to a desired elevation on the latter. The preferred thermoplastic may be of foamed structure and such a material on the order of 10 thousandths of an inch or greater in thickness provides a suitable sleeve S for handling on the machine.

After the plastic strip 34a is wound on mandrel 29 and seamed to form sleeve S, the mandrel 29 and chuck 13 travel together through an assembly station during which the two are at zero angular velocity and displacement with respect to each other. In this span of travel, roller 33a begins its rise on cam 33, and push-up bar 30 rises on mandrel 29, which elevates sleeve S into the telescopic assembly on bottle B. Sleeve S is supported thusly by push-up bar 30 during the flat span A of cam 33. At the point where bottle B and sleeve S thereon enter a space between the opposed tacking nozzle means 39a and 39b, the cam 33 falls away and push-up bar 30 is retracted from supporting contact with sleeve S. This entry point is represented on FIG. 1 by the vertical dashed line T.

SLEEVE TACKING APPARATUS

Figure 3:
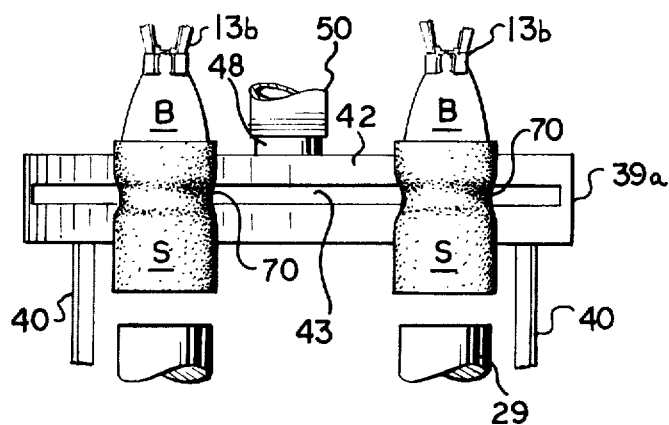
FIG. 3 is a fragmentary elevational view taken on a line 3—3 on FIG. 1 of the bottles and the radially innermost sleeve tacking nozzle of the invention.
Figure 4:
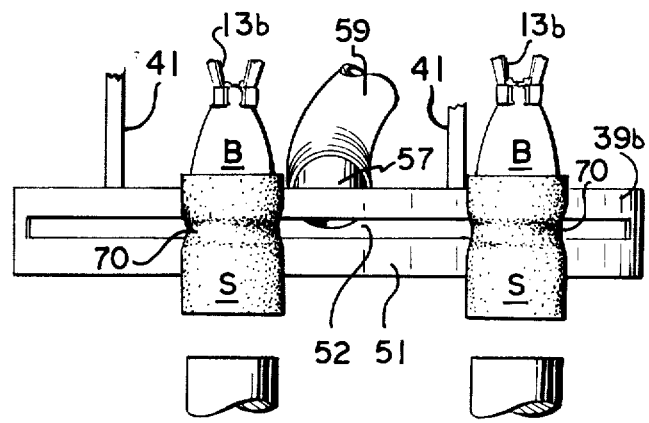
FIG. 4 is a fragmentary elevational view like FIG. 3 but taken on a line 4—4 on FIG. 1 of the bottles and the radially outermost sleeve tacking nozzle of the invention.

As shown on FIGS. 2–4, the elongated nozzle means 39 of the invention comprises two opposed hot air nozzles that are contoured to the path the article B must take in its carriage beyond the point where the plastic sleeve is assembled over article B. The outside nozzle member 39a is supported on vertical members 40 secured to the turret frame 10c (FIG. 1). The inside nozzle member 39b is disposed radially inwardly from the member 39a and is substantially parallel thereto, member 39b being supported on vertical standards 41 connected to the overhead frame 28 of the conveyor.

Nozzle member 39a has an inwardly facing, arcuate concave face 42 having an elongated slot 43 formed through the face and in communication with chamber 44; the latter being formed by the bottom wall 45, outer vertical side wall 46 and the top wall 47. The outer vertical wall 46 and inner face 42, at their respective end extremities, are joined to close the chamber 44 on all sides except for slot 43. Top wall 47 has an upstanding, circular pipe wall 48 defining opening 49 into chamber 44. Opening 49 is connected to a source of heated air or gaseous media (to be described) via flexible conduit 50 encircling wall 48.

Nozzle member 39b is somewhat similarly constructed to include an arcuate, convex face 51 that correspondingly parallels and opposes face 42 of the other member 39a, just described. Face 51 includes an elongated slot 52 that is situated at the same elevation as the opposite slot 52 that is situated at the same elevation as the opposite slot 43. The space between the convex face 51 and the concave face 42 is slightly greater than the diameter of the combination of bottle B with sleeve S in place thereon (see FIG. 2). Slot 52 communicates with interior chamber 53 defined by bottom wall 54, back wall 55 and top wall 56. The end extremities of back wall 55 and face 51 are connected to close the chamber 53 except for slot 52. An upwardly angled circular pipe wall 57 is connected into the top wall 56 and back wall 55 providing an opening 58 connecting into chamber 53, and a flexible conduit 59 encircles wall 57 for connecting the source of heated air or gaseous media into chamber 53.

Although nozzle openings are shown and described as slots 43 and 52, other nozzle forms will be suitable as alternative constructions, such as for example, plural, aligned slots, perforations along the nozzle face or a series of jets. The nozzle means of the invention embodies the various constructions which may functionally apply the opposed band heat to the plastic sleeve as the latter moves along the former.

The conduits 50 and 59 (FIG. 1) are connected at the Y-connector pipe 60 that is a part of pipe 61. A gas-fired burner 62 has its outlet connected to the opposite end of pipe 61 and gaseous hydrocarbon fuel or natural gas is furnished to burner 62 by fuel line 63 through regulator 64 and into the burner manifold. The fuel is ignited and burned in the known manner in burner 62 to furnish heated air at the outlet to pipe 61. Air in regulated volume is furnished to the burner by the blower 65 mounted on top of the oven chamber 12 and powered by an electric motor indicated at 66 connected to rotate blower 65. The outlet 67 of blower 65 is connected into the air intake of burner 62 by pipe 68. The blower 65 is operated in conjunction with burner 62 to supply the heated air into chambers 44 and 53 of the nozzle members 39a and 39b through conduits 50 and 59, respectively, at temperature in the range 200°–900°F and approximately 500 cfm. This heated air is forced through nozzle slots 43 and 52 (FIG. 2) and onto an exterior band region of sleeve S over bottle B. The heat is sufficient to promptly shrink the aforementioned plastic material of a band-like region of sleeve S firmly about the bottle B and hold the sleeve in its place thereon at proper elevation.

At the underside of the carriage frame below guide rail 25 (FIGS. 1 and 2) there is mounted a friction rail 72 supported by cantilevered brackets 73. Friction rail 72 has an arcuate front surface that conforms with the path the chucks 13 will travel past nozzles 39a and 39b. The friction rail 72 thereby engages the periphery of the annular driving (wheel) element 13c of each of the chucks 13 just as they enter the space between nozzles 39a, 39b and the rail extends along the span of the nozzles in the conveyor path. At the same time the wheel element 13c engages rail 72, rotation is imparted to the chuck 13 by the wheel rolling on the rail 72 along its length. The length of the rail may be varied to obtain desired amount of rotation. By rotation of the article during its traverse of the nozzle means, heat is applied more evenly in the annular band-like region around the sleeve.

Figure 5:
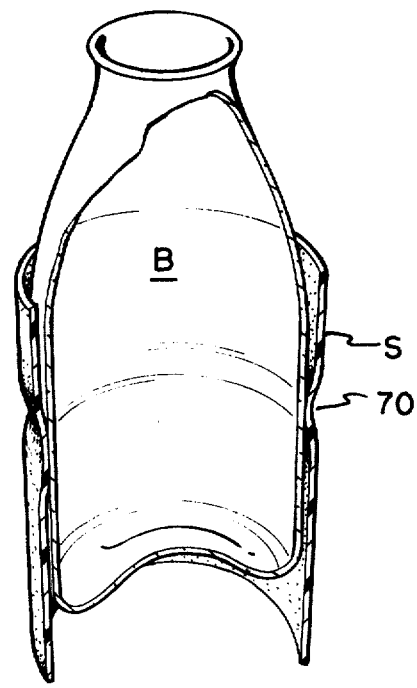
FIG. 5 is a spatial perspective view, partly broken away, showing the relationship of the plastic sleeve on the glass bottle after it traverses the sleeve tacking nozzle apparatus on the machine of FIG. 1.

As shown in FIGS. 3–5, this band-like region is shown by the pinched region 70 (exaggerated in extent on the drawings for clarity of illustration). The relationship of sleeve S on article B after traversing the nozzles 39a, 39b is illustrated in the sectioned view of FIG. 5, wherein a bottle B has a cylindrical sleeve S of a shrinkable plastic thereon, a narrow annuar band-like region 70 of the sleeve being shrunken (pinched) into firm band-like engagement with the exterior bottle surface, thereby holding the sleeve in place for travel from the nozzles (FIG. 1) into the final heating device 12.

The heating device 12 may be one of several available source of heat, such as, heated air circulated across the tunnel 12a, banks of infrared heater elements, such as lamps or resistance (cal-rod) heater elements, etc. The heat applied to the sleeves comprised of a foamed polystyrene of the thickness herein mentioned, during longitudinal travel of tunnel 12a is on the order of 400°F for a perod of 4–6 seconds. For different compositions or densities, thicknesses, etc. of the plastic material, this heat may be altered accordingly to perform the shrinkage. But, this second heat shrinkage treatment applied on the sleeve shrinks all of the sleeve S into conforming relationship snugly over the bottle B where applied.

Thus, the method herein employed utilizes two heat applications to the sleeve after it is placed on the base article, one a partial or zonal heat for tacking the sleeve in place, and the second, a complete and overall heat for shrinking the sleeve into a conforming covering of the article where applied.

Other forms of heating devices may be used in connection with or as replacements for the hot air nozzles; the latter being disclosed as the preferred mode of the invention because of its satisfactory performance and economy of operation.

The preferred mode of operation, as described hereinabove, includes the step in the method and the apparatus on the machine for rotating the articles B by the chucks during travel through the length of nozzles 39a, 39b. The rotation principle gives optimum results; however, the method and apparatus will function satisfactorily, i.e. the sleeve will be tacked in place on the article for further transport, without the rotation of the article through the heat applying nozzle means 39.

On the drawings on FIG. 1, the heating apparatus 12 includes a pre-heat tunnel 12b through which bottles B may be initially conveyed for pre-heating the articles prior to plastic sleeve assembly. This preheating step is described in the said U.S. Pat. No. 3,767,496.

Other and further modifications may be resorted to without departing from the spirit and scope of the appended claims.

What is claimed is:

1. An apparatus for assembling tubular, heat shrinkable, thermoplastic sleeves telescopically onto base articles, having a turret and plural spaced mandrels thereon, a final heating device for shrinking the sleeves onto said articles, a base article carriage with plural spaced chucks thereon carrying said articles in a path over the mandrels to receive a sleeve on each and thereafter into said final heating device and a stripper means operable at an assembly station in response to turret movement of each of the mandrels through said station for moving the sleeve from the mandrel onto an overhead article, the improvement therein comprising a contoured narrow, band-like elongated heat emitting means for emitting a narrow band-like pattern of heat corresponding in its longitudinal extent with said path adjacent said assembly station and in the direction of said heating device, and means supporting the heat emitting means along said path adjacent said assembly station at an elevation on the base article for directing heat in a narrow, intermediate band-like region of the sleeve assembled on the article being carried immediately beyond said assembly station, thereby shrinking an intermediate annular band-like portion of the sleeve initially into annular engagement on the article sufficiently to hold said sleeve in position thereon during travel through the balance of said path and into said final heating device.

2. The apparatus defined in claim 1, wherein said base articles comprise glass bottles or the like.

3. The apparatus defined in claim 2, wherein the path described by said turret and the bottle carriage includes a common arcuate portion, and said heat emitting means is supported in a stationary position along said arcuate portion of said path by the said supporting means.

4. The apparatus defined in claim 3, wherein the heat emitting means comprises opposed arcuately extending nozzles defined by opposed arcuate facing members being supported by the said supporting means in spaced substantially parallel relation on either side of said arcuate path portion, and an elongated narrow band-like slot through each of the opposed facing members, thereby providing opposed nozzles for applying said narrow, elongated band-like pattern of heat onto the sleeves, a chamber means communicating with each of the nozzle slots and including a heat source comprising an air heater, and means connecting each of the chamber means to said source of heated air, the bottles being advanced by said carriage passing between said opposed hot air nozzles just after receiving a sleeve thereon at said assembly station.

5. The apparatus defined in claim 4, wherein said source of heated air is connected to a means for pressurizing the heated air, the opposed arcuate facing members being spaced apart on either side of said arcuate path portion an amount slightly greater than the diametrical dimension of the sleeve on the bottle, and means connecting the pressurized, heated air to each of said chambers for applying opposed, elongated bands of heat by said opposed elongated slots onto an intermediate region of the sleeve overlying a body portion of the bottle, whereby a band portion intermediate the axial ends of the sleeve is shrunken into firm contact with the underlying bottle.

6. The apparatus defined in claim 1, wherein said plural spaced chucks are rotatably mounted on the base article carriage, rotatable drive means on said chucks operable for rotating each of the chucks about its longitudinal axis, and said improved apparatus includes in combination therewith a means engageable with said rotatable drive means of the chucks individually responsive to movement in said path successively past said assembly station and said elongated heat emitting means for rotating the chucks and articles thereon during the application of heat to the narrow, intermediate band-like region of the sleeves on the articles by said heat emitting means.

7. The apparatus defined in claim 6, wherein the rotatable drive means on said chucks includes an annular driving element coaxially connected to said chuck, and said means engageable with the rotatable drive means of said chucks comprises a friction rail corresponding to the said path adjacent said assembly station, and means supporting said rail along said path adjacent the assembly station and in the direction of said heating device coextensive with the heat emitting means span for engaging said driving elements successively, thereby rotating the chucks and articles thereon about their axes responsive to movement of the articles past the heat emitting means.

8. In apparatus for assembling a preformed, highly circumferentially oriented thermoplastic sleeve that is heat shrinkable on a container article; wherein the sleeves of said thermoplastic are carried on a plurality of spaced mandrels of a turret device, and including a final heating device spaced from the turret device for totally heat shrinking the sleeves on the articles, an article carriage having plural spaced apart chucks thereon carrying said articles in a path in registry with the mandrels at an assembly station and thereafter, upon receiving a thermoplastic sleeve on the article, carrying same into and through said final heating device, and a reciprocating sleeve stripper means operable in response to movement of each of the mandrels by said turret through the assembly station by a cam and follower for shifting the stripper means axially along the mandrels from a retracted first position to an extended second position thereby transferring each sleeve telescopically from the mandrels to the articles in an assembled position with the stripper means at said second position, the improvement therein comprising:
   an elongated, narrow heat applying means, and
   means supporting the heat applying means along the path of the movement of the articles at the assembly station whereat the stripper means is in its extended second position,
   said supporting means maintaining the elevation of the narrow, elongated heat applying means opposite an intermediate region of the assembled sleeve while carried in said path toward said final heating device for heating a band-like region of the thermoplastic sleeve intermediate its axial ends while carried on the container in its path along said heat applying means sufficiently to shrink an annular band-like region of the sleeve into firm engagement with the article, thereby assuring the assembled position of the sleeve on the article at the final heating device.

9. The apparatus improvement of claim 8, which includes a substantial dwell portion of the stripper cam contour at the assembly station for holding said stripper means in its extended second position to overlapping relationship with said heat applying means, the assembled sleeve being positively held by said stripper means in position during initial application of heat to a band-like region of the sleeve.

10. The apparatus improvement of claim 8, wherein the article carrying chucks are rotatable on the carriage about a longitudinal axis coincident with the container axis disposed normal to the carriage path, there being a rotatable drive element connected on each of the chucks for rotating them, and a drive means engageable in succession with the drive elements of the chucks for rotating them during movement past said elongated, narrow heat applying means.

* * * * *